United States Patent
Mizutani et al.

(10) Patent No.: US 8,164,768 B2
(45) Date of Patent: Apr. 24, 2012

(54) PRINTERS AND PRINT METHODS FOR IMAGE DATA WITH SECURITY SETTINGS

(75) Inventors: Norio Mizutani, Mie-ken (JP); Naoki Hashimoto, Nagoya (JP); Kousuke Fukaya, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1094 days.

(21) Appl. No.: 12/071,737

(22) Filed: Feb. 26, 2008

(65) Prior Publication Data

US 2008/0212123 A1   Sep. 4, 2008

(30) Foreign Application Priority Data

Feb. 27, 2007   (JP) .................. 2007-046480

(51) Int. Cl.
   *G06F 15/00*   (2006.01)
(52) U.S. Cl. .............. 358/1.13; 358/1.14; 358/403
(58) Field of Classification Search ............ 358/1.1, 358/1.13, 1.14, 1.16, 401, 403, 442, 444
   See application file for complete search history.

(56) References Cited

U.S. PATENT DOCUMENTS

| | | | |
|---|---|---|---|
| 7,333,234 B2 * | 2/2008 | Nihei | 358/1.2 |
| 2002/0047869 A1 | 4/2002 | Takiguchi | |
| 2006/0023235 A1 * | 2/2006 | Fukuda et al. | 358/1.9 |
| 2007/0035791 A1 | 2/2007 | Shimura | |
| 2007/0081189 A1 * | 4/2007 | Kamei et al. | 358/1.18 |
| 2008/0170261 A1 | 7/2008 | Mizutani et al. | |

FOREIGN PATENT DOCUMENTS

| | | |
|---|---|---|
| JP | 3-144719 | 6/1991 |
| JP | 2001-326885 | 11/2001 |
| JP | 2002-112011 | 4/2002 |
| JP | 2002-366408 | 12/2002 |
| JP | 2003-023566 A | 1/2003 |
| JP | 2003-087454 A | 3/2003 |
| JP | 2003-326773 | 11/2003 |
| JP | 2005-341518 A | 12/2005 |
| JP | 2006-253751 A | 9/2006 |
| JP | 2007-049451 A | 2/2007 |
| JP | 2008-173804 A | 7/2008 |

OTHER PUBLICATIONS

Japan Patent Office, Notification of Reason for Refusal for Japanese Patent Application No. 2007-046480 (counterpart to above-captioned patent application), dispatched Mar. 22, 2011.

* cited by examiner

*Primary Examiner* — Thomas D Lee

(74) *Attorney, Agent, or Firm* — Baker Botts L.L.P.

(57) ABSTRACT

A printer which has a direct-printing function for reading and printing information stored in a storage device and which includes: an interface unit which receives the storage device, the storage device storing file information including content information for print or display and restrictive information for controlling output of the content information; a reading unit which reads the restrictive information from the storage device; a setting unit which sets indication information indicating the file information according to the content information and the restrictive information; and an indication outputting unit which outputs information based on the indication information set by the setting unit.

17 Claims, 11 Drawing Sheets

FIG. 3

| | 23a1 | 23a2 | 23a3 | 23a4 |
|---|---|---|---|---|
| FILE NAME | FORMAT | SECURITY | VIEWABLE (WITHOUT RELEASING SECURITY) | PRINTABLE (WITHOUT RELEASING SECURITY) |
| FILE 1 | SUPPORTED | EXIST | ○ | ○ |
| FILE 2 | SUPPORTED | EXIST | ○ | × |
| FILE 3 | SUPPORTED | EXIST | × | × |
| FILE 4 | SUPPORTED | NOT EXIST | — | — |
| FILE 5 | NOT SUPPORTED | NOT EXIST | — | — |

23a

FILE LIST

| FILE 1 | FILE 2 | FILE 3 | FILE 4 | FILE 5 |

PRINTERS AND PRINT METHODS FOR IMAGE DATA WITH SECURITY SETTINGS

CROSS-REFERENCE TO RELATED APPLICATION

This application claims priority from Japanese Patent Application No. 2007-046480, filed on Feb. 27, 2007, the entire subject matter of which is incorporated herein by reference.

TECHNICAL FIELD

Aspects of the present invention relate to printers and an output method employed in the printers, which allow a user to correctly recognize the contents of file information stored in a storage device and which provide improved usability for the printers having a direct printing function.

BACKGROUND

A printer has a direct printing function which directly prints image data or print data stored in the memory card connected to the printer, without assistance of a host device such as personal computers (e.g., see JP-A-2003-326773)

Memory cards have been sufficiently reduced in size for easy portability. Users can carry a memory card so that they can connect it to a printer having the direct printing function to view print data for work or image data of photographs at any time. Thus, users can readily print and view document by only connecting the memory card to a printer having the direct printing function without the assistance of a host device.

Additionally, a printer having the direct printing function also has a screen display function for displaying a reduced image and a file name of each piece of data on a liquid crystal display, and an index-printing function for printing a list of reduced image and a file name of each piece of data. Therefore, users can selectively print image data or print data stored in a memory card.

Each piece of data may be stored in the memory card with a certain level of security so as not to be manipulated by others than a user who created the data. The security for such data have multiple levels, e.g., a security for prohibiting only printing of data, a security for prohibiting only viewing of data, and a security for prohibiting both printing and viewing of data.

When users connect a memory card, which contains data with security, to a printer and select the screen display function or the index printing function, data with the security for prohibiting printing would be prohibited from being printed, or data with the security for prohibiting viewing would be prohibited from being displayed by the displaying function.

However, assuming that the users have selected the screen display function, for example, and data (file information) is stored in the memory card (storage device) with a level of security (restrictive information) for permitting viewing of data but prohibiting printing of data, reduced images of the data or the file names are displayed on the liquid crystal display even though printing of the data is prohibited. Users visually identify the contents displayed on the liquid crystal display to determine whether to execute printing of the data. Therefore, the users would be misled into believing that the data prohibited from being printed could be printed since the reduced images or file names are displayed even though printing of the data is prohibited.

Additionally, the users who were misled into believing that the data prohibited from being printed could be printed may try to print the data that is actually prohibited from being printed. This would result in printing of the data not being executed or only blank paper coming out from the printer even when the printing has been executed. Thus, even though the users tried to print the data, the users cannot print it as desired, thereby impairing the usability of the printer (printer apparatus).

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a printer and an output method employed in the printer, which allow the users to correctly recognize contents of file information stored in a storage device and which provide improved usability for the printer having the direct printing function.

The above and other aspects of the present invention are accomplished by providing a printer which has a direct-printing function for reading and printing information stored in a storage device and includes: an interface unit which receives the storage device, the storage device storing file information including content information for print or display and restrictive information for controlling output of the content information; a reading unit which reads the restrictive information from the storage device; a setting unit which sets indication information indicating the file information according to the content information and the restrictive information; and an indication outputting unit which outputs information based on the indication information set by the setting unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 3 is a schematic view illustrating an example of restrictive information to be stored in a restrictive information storage area;

DETAILED DESCRIPTION

<First Exemplary Embodiment>

Figure 1:
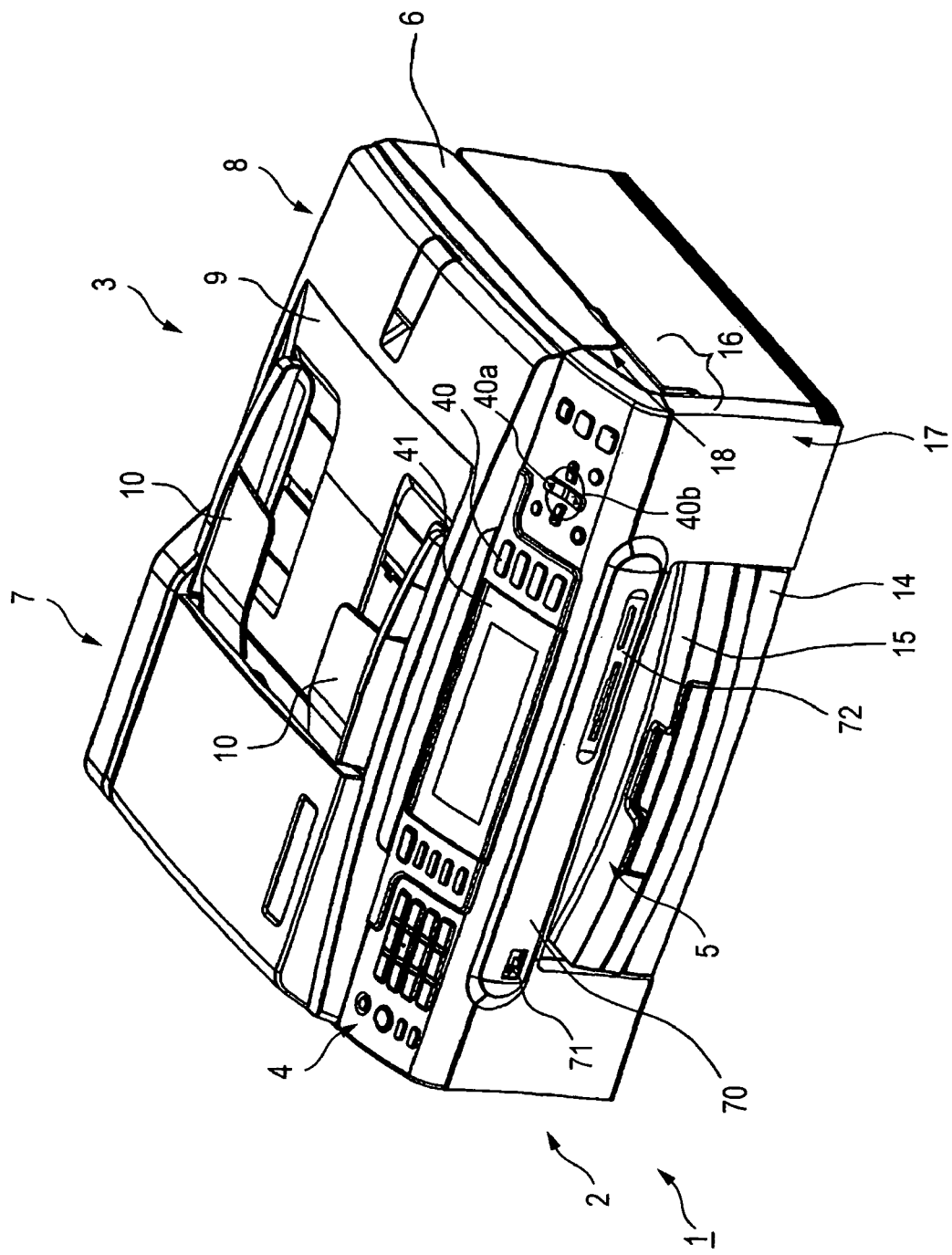
FIG. 1 is a perspective view illustrating the outer configuration of a multi-function peripheral according to a first exemplary embodiment of the present invention.

Now, a first exemplary embodiment of the present invention will be explained below in more detail with reference to the accompanying drawings. FIG. 1 is a perspective view illustrating the outer configuration of a multi-function peripheral 1 according to the first exemplary embodiment of the present invention. The embodiments described below are only exemplified embodiments of the present invention, and may be modified as appropriate within the scope and spirit of the present invention.

Referring to FIG. 1, a brief description will be made for the outer configuration of the multi-function peripheral 1 and the functions provided with the multi-function peripheral 1. The multi-function peripheral (MFP) 1 includes a printer 2 provided in a lower portion, a scanner 3 provided in an upper portion, and an operation panel 4 provided in front of the scanner 3, all of which are integrated. The multi-function peripheral 1 has a scanner function, a copying function, a facsimile function and the like.

Additionally, the multi-function peripheral 1 has a direct printing function (also referred to as the "media function"), which allows the multi-function peripheral 1 to be connected to an external device, such as a digital camera, to print data read from the connected external device onto a recording sheet. The direct printing function also allows, when various types of storage media such as a memory card 42 (see FIG. 2, a storage device) is loaded into the multi-function peripheral 1, the multi-function peripheral 1 to retrieve data (file information) stored in the loaded storage medium and to print on a recording sheet.

The multi-function peripheral 1 has a function which allows the multi-function peripheral 1 to couple mainly to a computer (not shown) (including a computer on a network) to record (print) images or documents on a recording sheet based on image data or document data transmitted from the computer. Furthermore, the multi-function peripheral 1 is also capable of recording images not only on recording sheets but also on transparent film sheets for OHP use or on cloth.

The multi-function peripheral 1 may serve to execute various types of functions for receiving data, sending the data to the external device (such as a digital camera or computer) coupled to the multi-function peripheral 1, and store the transmitted data on the external device. The multi-function peripheral 1 may serve to execute a function for controlling devices to process, display, transmit, or print the transmitted data. The multi-function peripheral 1, to which the exemplary embodiments of the present invention is applied, does not have to include all the above functions but may only have at least the direct printing function.

The scanner 3 includes a document reader stage 6 serving as a Flatbed Scanner (FBS), and a document cover 8 with an automatic document feeder (hereinafter referred to as the ADF) 7 on the document reader stage 6, where the document cover 8 is provided on rear hinges (not shown) so as to be pivotally opened and closed. Furthermore, although not illustrated, a sheet of platen glass is disposed on the upper surface of the document reader stage 6, with an image reader unit incorporated inside the document reader stage 6.

The printer 2 is an image recording apparatus of the so-called ink jet type (ink jet recording apparatus) which selectively ejects ink drops based on image data read by the scanner 3 or image data input externally to record images on recording sheets. Moreover, the above ink jet type is merely an example of those image recording systems employed by the printer 2. It is also possible to employ various types of image recording systems such as the electrophotographics system or the thermal transfer system.

On the front of the multi-function peripheral 1, in other words, on the front of the printer 2, there is formed an opening 5, inside of which a sheet feeder tray 14 and a sheet delivery tray 15 are provided so as to be housed therein. Additionally, the printer 2 is provided with a sheet conveyance path (not shown) which extends upwardly from the rear of the sheet feeder tray 14 and which is U-curved to the front side, and communicates with the sheet discharge tray 15.

The operation panel 4 is configured to have various operation keys 40 and a liquid crystal display (LCD) 41. Furthermore, the various operation keys 40 include an UP cursor key 40a and a DOWN cursor key 40b. The operation panel 4 is manipulated to operate the printer 2 and the scanner 3 or manipulated to change various settings of the multi-function peripheral 1 or check the various settings. A manipulation on the operation panel 4 by users would cause a desired command corresponding to the manipulation to be entered to a control unit 20 (see FIG. 2), thereby allowing the control unit 20 to control the operation of the multi-function peripheral 1.

The multi-function peripheral 1 is configured to operate based on an instruction associated with the manipulation of the operation panel 4 as well as an instruction transmitted from a computer coupled thereto via printer driver or a scanner driver. The multi-function peripheral 1 is also configured to operate based on an instruction transmitted from a computer on a network via a network interface (see FIG. 2).

Next, description will be made for a connection panel 70 provided above the opening 5 of the printer 2. The connection panel 70 is configured to have a USB terminal 71 disposed at left end side and a slot portion 72 disposed at right end side.

The USB terminal 71 is a connector terminal which allows a USB connection with an external device such as a digital camera or computer, thereby enabling communication between the external device and the multi-function peripheral 1. The slot portion 72 is provided with a plurality of card slots into which the memory card 42 (see FIG. 2) can be loaded. In place of the slot portion 72, a receiving portion which receives data may be provided to receive data through the communication with the memory card 42.

When the memory card 42 is loaded into a card slot of the slot portion 72, image data can be read from the loaded memory card 42. Then, the read image data or the information regarding the image data (such as restrictive information, control information) can be displayed on the LCD 41 (in the screen display process, described later). It is also possible to print the read image data or the information regarding the image data on a recording sheet (in the index printing process, described later). It is also possible to read any image data from the memory card 42 for printing on a recording sheet (in the printing process, described later).

Figure 2:
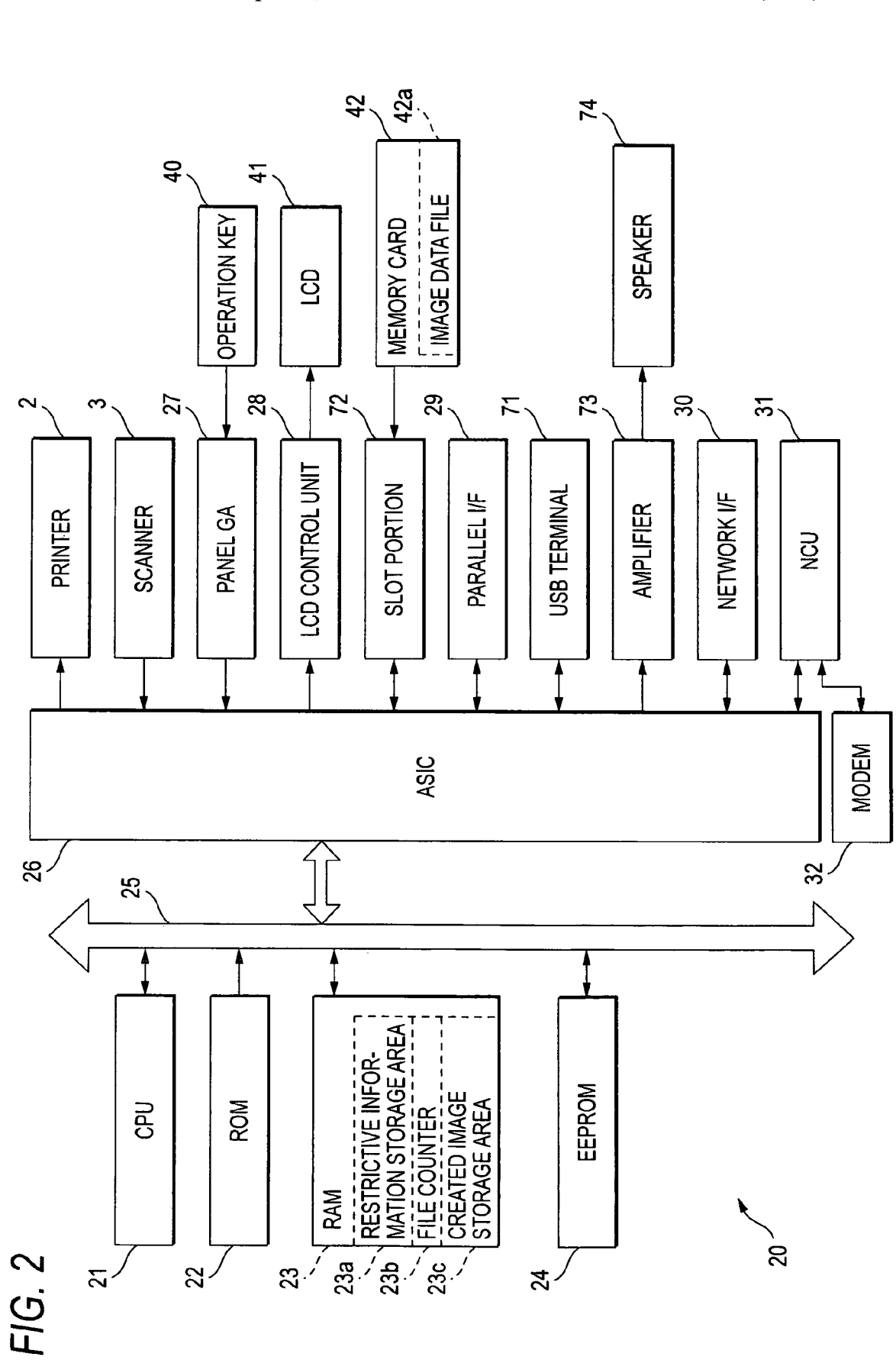
FIG. 2 is a block diagram illustrating the schematic configuration of a control unit of the multi-function peripheral.

Referring to FIG. 2, description will be made for the schematic configuration of the control unit 20 which controls the operation of the multi-function peripheral 1. FIG. 2 is a block diagram illustrating the schematic configuration of the control unit 20 of the multi-function peripheral 1. The control unit 20 collectively controls the operation of the multi-function peripheral 1 including the printer 2, the scanner 3, and the operation panel 4.

As shown in FIG. 2, the control unit 20 is configured as a microcomputer including a Central Processing Unit (CPU) 21, a Read Only Memory (ROM) 22, a Random Access Memory (RAM) 23, and an Electrically Erasable and Programmable ROM (EEPROM) 24. The control unit 20 is coupled to an Application Specific Integrated Circuit (ASIC) 26 via a bus 25.

The CPU 21 controls the multi-function peripheral 1 to follow the flowchart (program) shown in FIGS. 4 and 5, FIG. 7, FIG. 8, and FIG. 10. The ROM 22 stores programs for controlling various operations of the multi-function peripheral 1, predetermined default data, and the like. The RAM 23 temporarily stores various types of data for use by the CPU 21 to execute the programs. The RAM 23 is also provided with a restrictive information storage area 23a, a file counter 23b, and a created image storage area 23c.

The restrictive information storage area 23a temporarily stores restrictive information (control information) created based on an image data file 42a on the memory card 42 loaded in (coupled to) the slot portion 72. The restrictive information stored in the restrictive information storage area 23a is created by reading necessary information from the image data file 42a on the memory card 42 when the screen display process (see FIG. 4) and the index printing process (see FIG. 7), to be described later, is executed. An example of restrictive information stored in the restrictive information storage area 23a will be described later with reference to FIG. 3.

The file counter 23b stores a counter value for specifying one of a plurality of files stored in the memory card 42. The value of the file counter 23b will be set to an initial value (value 1), and then incremented or decremented in the screen display process and the index printing process, which will be described later.

The created image storage area 23c temporarily stores a reduced image of image data created in the index printing process. The created image storage area 23c may also temporarily store reduced images for displaying screen.

Next, description will be made for the operation of the ASIC 26 and to each component coupled to the ASIC 26. The ASIC 26 controls the operation of the printer 2, the scanner 3, the operation panel 4, and the slot portion 72 according to an instruction from the CPU 21 (e.g., control the operation of a motor for driving the printer 2, the ink jet recording head, a motor for driving the ADF 7 of the scanner 3, the image reader unit and the like).

The ASIC 26 is also coupled with a control panel gate array 27 for controlling the operation keys 40 used for entry of desired commands into the multi-function peripheral 1, and an LCD control unit 28 for controlling the screen display on the LCD 41.

More specifically, the LCD control unit 28 is directed by the CPU 21 to provide control such that image data associated with the image to be displayed on the LCD 41 is stored in the display memory (not shown) in the RAM 23, and the image data stored in the display memory is read to be displayed on the LCD 41. The LCD control unit 28 controls the LCD 41 to display an image corresponding to the image data read by the scanner 3 as well as to display an image corresponding to the image data read from an externally coupled device (such as a digital camera or computer) or the memory card 42 loaded into the slot portion 72.

Additionally, the ASIC 26 is coupled with a parallel interface 29 and the USB terminal 71 for sending data to and receiving data from a computer via a parallel cable or a USB cable, a Network Control Unit (NCU) 31 and a modem 32 for implementing the facsimile function, and an amplifier 73. The amplifier 73 is connected with a speaker 74, so that the speaker 74 sounds to output a ringing tone, a busy tone, or a message.

Furthermore, the ASIC 26 is coupled with a network interface (network I/F) 30 for providing access to a computer existing on a network. The network I/F 30 is capable of coupling with a plurality of computers existing on a network so as to transmit data to and receive data from a computer on the network.

Next, referring to FIG. 3, description will be made for an example of restrictive information stored in the restrictive information storage area 23a. FIG. 3 is a schematic view illustrating an example of restrictive information stored in the restrictive information storage area 23a. The restrictive information stored in the restrictive information storage area 23a is created based on information (restrictive information) other than the image data read from the memory card 42.

As shown in FIG. 3, in the first exemplary embodiment, restrictive information stored in the restrictive information storage area 23a includes five files, that is, files 1 to 5. For each of the files 1 to 5, the restrictive information storage area 23a includes a format area 23a1 which indicates whether a file has a format (such as document style and storage format) recognizable by the multi-function peripheral 1, a security area 23a2 which indicates whether security exists for a file, a viewable area 23a3 which indicates whether a file is viewable without releasing the security, and a printable area 23a4 which indicates whether it is printable without releasing the security.

The "Supported" indicated in the format area 23a1 of each of the files 1 to 5 in FIG. 3 shows that the image data is recognizable by the multi-function peripheral 1, whereas "Not Supported" shows that the image data is not recognizable by the multi-function peripheral 1. The "Exist" indicated in the security area 23a2 of each of the files 1 to 5 shows that the image data has a certain level of security, whereas "Not Exist" shows that the image data has no level of security. Moreover, "○" indicated in the viewable area 23a3 shows that the image data can be viewed (displayed) without releasing the security, whereas "x" shows that the image data cannot be viewed without releasing the security. Finally, "○" indicated in the printable area 23a4 shows that the image data can be printed without releasing the security, whereas "x" shows that the image data cannot be printed without releasing the security. Furthermore, an indication "–" of the files 4 and 5 shows that the image data has no security, and thus no information is provided as to whether the image data is viewable without releasing security or whether it is printable.

Here, description will be made for the files 1 to 5. As to the file 1, the format of the image data is recognizable by the multi-function peripheral 1; the image data has a certain level of security; the image data is viewable without releasing the security; and the image data is printable without releasing the security. Furthermore, the image data of the file 1 is viewable and printable without releasing the security but has security. For example, this security may serve to prohibit the image data from being combined or copied.

As to the file 2, the format of the image data is recognizable by the multi-function peripheral 1; the image data has a certain level of security; the image data is viewable without releasing the security; but the image data cannot be printed without releasing the security.

As to the file 3, the format of the image data is recognizable by the multi-function peripheral 1; the image data has a certain level of security, the image data cannot be viewed without releasing the security; and the image data cannot be printed without releasing the security.

As to the file 4, the format of the image data is recognizable by the multi-function peripheral 1, and the image data has no security. Thus, the image data of the file 4 is viewable and printable by any user.

As to the file 5, the format of the image data is not recognizable by the multi-function peripheral 1, and the image data has no security. The image data of the file 5 is created in a format which cannot be recognized by the multi-function peripheral 1, and thus cannot be printed and displayed by the multi-function peripheral 1.

[Screen Display Process]

Figure 4:
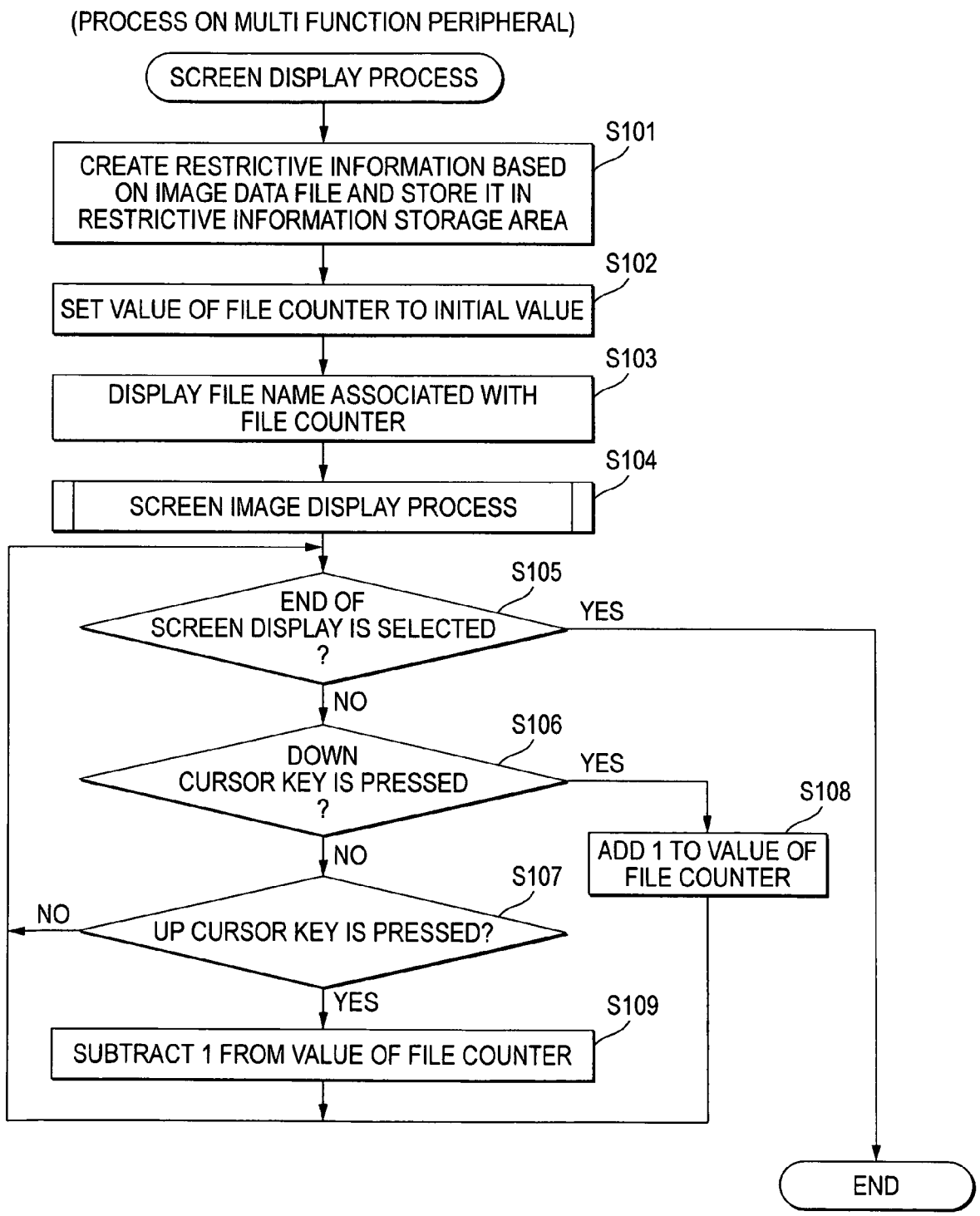
FIG. 4 is a flowchart showing a screen display process executed by a CPU of the multi-function peripheral.
Figure 5:
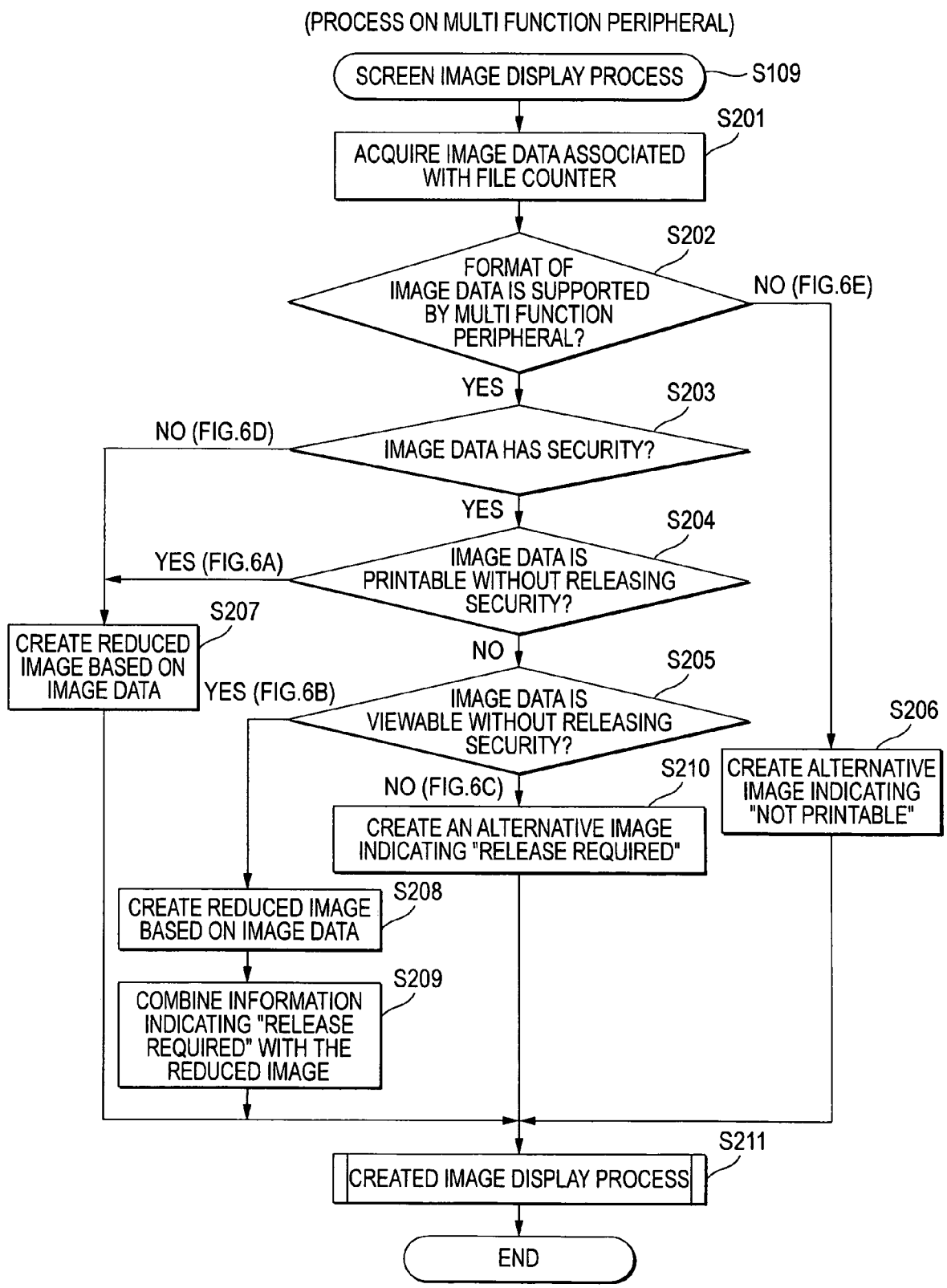
FIG. 5 is a flowchart showing a screen image display process executed in the screen display process.

Next, referring to FIGS. 4 to 6, description will be made for the case where the image data stored in the image data file 42*a* on the memory card 42 coupled to the slot portion 72 is displayed on the screen of the liquid crystal display 41. FIG. 4 is a flowchart showing the screen display process executed by the CPU 21 of the multi-function peripheral 1. FIG. 5 is a flowchart showing the screen image display process executed in the screen display process. FIGS. 6A to 6E are views illustrating an example of a screen displayed on the liquid crystal display 41.

The screen display process is executed when the "Screen display" function is selected among the plurality of functions by manipulating of the operation key 40, for example, by the users (operators). In the screen display process, file names and image data are displayed on the liquid crystal display 41 each time when one file is selected. A change in the file name or the image data displayed on the liquid crystal display 41 is made each time the cursor key 40*a* or 40*b* of the operation keys 40 is pressed (see FIG. 1). In the first exemplary embodiment, although non-specified files will not be displayed on the liquid crystal display 41, such an indication may be provided which shows the existence of the non-specified files using an indication of only characters, a small indication or the like.

When the screen display process shown in FIG. 4 is executed, the restrictive information is created based on the image data file 42*a* stored in the memory card 42, and then the created restrictive information is stored in the restrictive information storage area 23*a* (S101). The restrictive information that is stored in the restrictive information storage area 23*a* in process S101 is the restrictive information shown in FIG. 3.

The restrictive information is created by reading information other than image data from the image data file 42*a*. As described above, the information other than image data includes formats, the existence of security, and the contents of security. The image data file 42*a* stores information such as the format or style of image data for each file. Depending on whether the multi-function peripheral 1 supports the format or style of the image data, either "Supported" or "Not Supported" is set in the format.

Figure 6A:
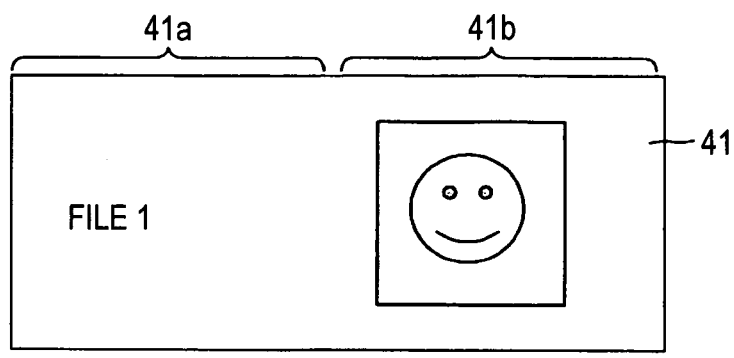
FIGS. 6A to 6E are views illustrating examples of a screen displayed on a liquid crystal display.

When the restrictive information is created in process S101, an initial value as 1 is set to the value of the file counter 23*b* (S102), and then the file name associated with the value of the file counter 23*b* is displayed (S103). In the first exemplary embodiment, the value of the file counter 23*b* and the file name are associated with each other, so that the file 1 is displayed when the value of the file counter 23*b* is 1. As shown in FIG. 6A, "file 1" is displayed on a left area 41*a* of the liquid crystal display 41 in process S103.

When the file name displayed on the left area 41*a* of the liquid crystal display 41 in process S103, the screen image display process is executed (S104) in order to display an image corresponding to the image data on the screen. Then, the flow proceeds to S105. The screen image display process displays a reduced image indicating the contents of the image data of each file on a right area 41*b* of the liquid crystal display 41. The screen image display process will be described later with reference to FIG. 5.

In process S105, it is determined whether end of the screen display has been selected. If an operation key 40 is manipulated to select the end of the screen display (S105: Yes), then the process ends.

On the other hand, if it is not selected the end of the screen display (S105: No), then in order to continue the screen display process, it is determined whether the DOWN cursor key 40*b* has been pressed (S106). It is then determined whether the UP cursor key 40*a* has been pressed (S107).

If the DOWN cursor key 40*b* is pressed (S106: Yes), then in order to display the next file on the liquid crystal display 41, 1 is added to the value of the file counter 23*b* (S108). After that, the flow proceeds to process S103.

On the other hand, if the UP cursor key 40*a* is pressed (S106: No, S107: Yes), then in order to display the previous file on the liquid crystal display 41, 1 is subtracted from the value of the file counter 23*b* (S109), and then the flow proceeds to process S103.

A value is not added to a maximum value (five in the first exemplary embodiment) in the file counter 23*b*, while a value is not subtracted from a minimum value (one in the first exemplary embodiment) in the file counter 23*b*. When a value is added to the maximum value of the file counter 23*b*, the value of the file counter 23*b* may be set to the minimum value. Additionally, when a value is subtracted from the minimum value of the file counter 23*b*, the value of the file counter 23*b* may be set to the maximum value.

On the other hand, if neither the UP cursor key 40*a* nor the DOWN cursor key 40*b* has been pressed (S106: No, S107: No), then no value is added to or subtracted from the file counter 23*b*. Then, the flow proceeds to process S105.

Accordingly, if neither the UP cursor key 40*a* nor the DOWN cursor key 40*b*, the file displayed on the liquid crystal display 41 remains unchanged and the display is continued. On the other hand, if either the UP cursor key 40*a* or the DOWN cursor key 40*b* is pressed, the file displayed on the liquid crystal display 41 is changed.

Next, referring to FIG. 5, description will be made for the screen image display process executed in process S104. When the screen image display process is executed in the screen display process, the image data associated with the value of the file counter 23*b* is acquired from the image data file 42*a* of the memory card 42 (S201). For example, in process S201, if the value of the file counter 23*b* is 1, then the image data associated with the file 1 is acquired, Then, with reference to the format area 23*a*1 of the restrictive information created in process S101 (see FIG. 4) and stored in the restrictive information storage area 23*a*, it is determined whether the format of the acquired image data in process S201 is supported by the multi-function peripheral 1 (S202).

If it is determined in process S202 that the multi-function peripheral 1 supports the format of the acquired image data (S202: Yes), then with reference to the security area 23*a*2 of the restrictive information created in process S101 (see FIG. 4) and stored in the restrictive information storage area 23*a*, it is determined whether the acquired image data has security (S203).

If it is determined in process S203 that the acquired image data has security (S203: Yes), then with reference to the printable area 23*a*4 of the restrictive information created in process S101 (see FIG. 4) and stored in the restrictive information storage area 23*a*, it is determined whether the acquired image data can be printed (printable) without releasing the security (S204).

If it is determined in process S204 that the acquired image data cannot be printed without releasing the security (S204: No), then with reference to the viewable area 23*a*3 of the restrictive information created in process S101 (see FIG. 4) and stored in the restrictive information storage area 23*a*, it is determined whether the acquired image data can be viewed (viewable) without releasing the security (S205).

Now, description will be made for processes S202 to S205 in more detail with the files 1 to 5 as shown in FIG. 3 taken as examples. First, process S202 is described. In the first exemplary embodiment, as shown in FIG. 3, the format of the image data of the files 1 to 4 is recognizable by the multi-function peripheral 1 ("Supported") (S202: Yes), whereas only the image data of the file 5 is not recognizable by the multi-function peripheral 1 ("Not Supported") (S202: No).

Accordingly, when the value of the file counter 23*b* is 5 and the image data of the file 5 has been acquired, it is determined that the format of the image data is not supported by the multi-function peripheral 1 (S202: No) and can be neither printed nor displayed by the multi-function peripheral 1. Thus, an alternative image indicating "Not printable" is created (S206), and then the displaying process of the created alternative image is executed (S211). After that, the process ends.

Figure 6B:
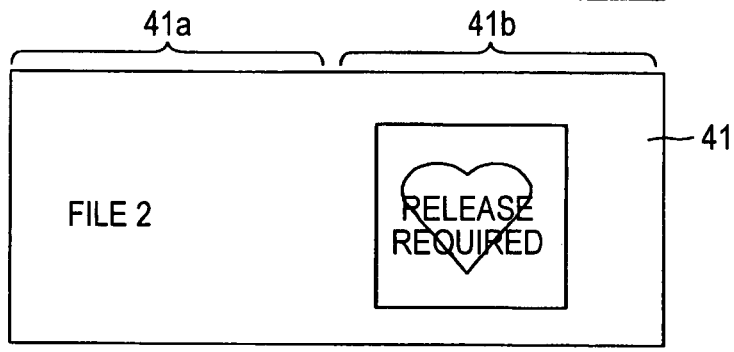
Figure 6C:
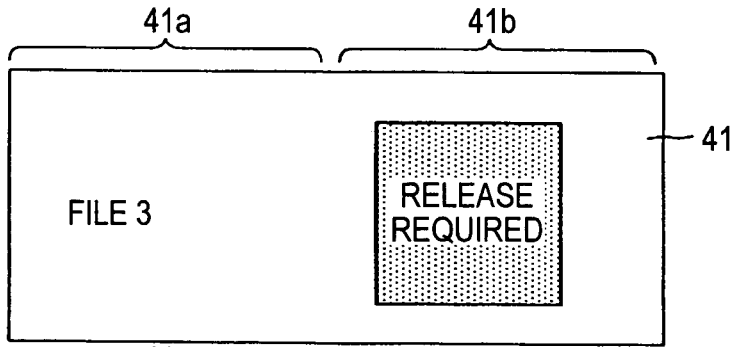
Figure 6D:
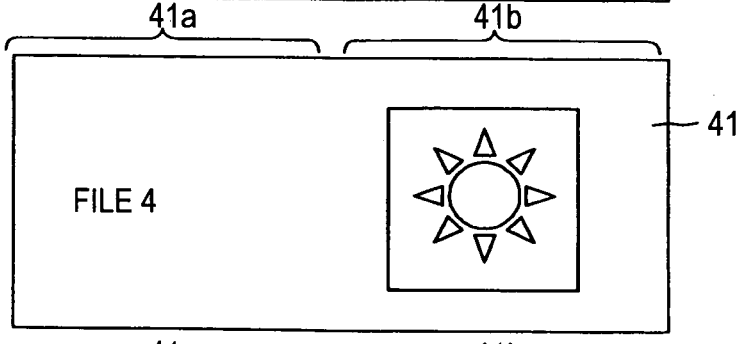
Figure 6E:
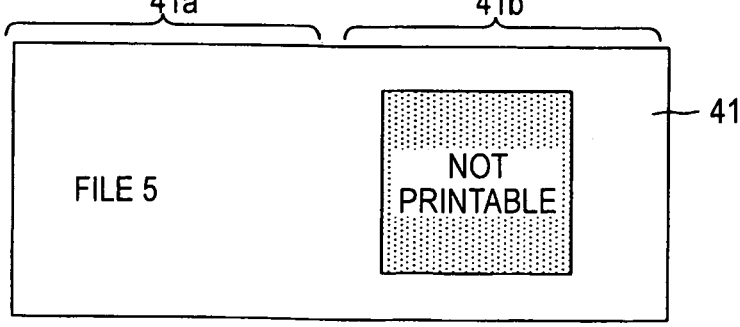

As shown in FIG. 6E, the alternative image created in process S206 and labeled with "Not printable" is displayed on the right area 41*b* of the liquid crystal display 41. Additionally, the file name "file 5" is displayed on the left area 41*a* of the liquid crystal display 41.

Next, process S203 will be described. In the first exemplary embodiment, as shown in FIG. 3, among the files 1 to 4 whose image data format has been determined to be supported, the files 1 to 3 have security (S203: Yes), whereas the file 4 has no security (S203: No).

Accordingly, when the value of the file counter 23*b* is 4 and the image data of the file 4 has been acquired, it is determined that the image data has no security (S202: Yes, S203: No). Since the image data of the file 4 can be displayed as it is, a reduced image is created according to the image data (S207) and the display process of the created reduced image is executed (S211). After that, the process ends.

As shown in FIG. 6D, the reduced image created in process S207 is an image of "Sun" which is displayed on the right area 41*b* of the liquid crystal display 41. The "file 4" is displayed on the left area 41*a* of the liquid crystal display 41. The image of "Sun" is created only by reducing the size of the image data of the file 4.

Next, process S204 will be described. In the first exemplary embodiment, as shown in FIG. 3, among the files 1 to 3 whose image data has been determined to have the format supported by the multi-function peripheral 1 and security, the file 1 can be printed without releasing the security (S204: Yes), whereas the files 2 and 3 cannot be printed without releasing the security (S204: No).

Accordingly, when the value of the file counter 23*b* is 1 and the image data of the file 1 has been acquired, it is determined that the image data can be printed (printable) without releasing the security (S202: Yes, S203: Yes, and S204: Yes). Since the image data of the file 1 can be displayed as it is, a reduced image is created based on the image data (S207) and a display process of the created reduced image is executed (S211). After that, the process ends.

As shown in FIG. 6A, the reduced image created in process S207 if it is determined that the file 1 can be printed without releasing the security (S204: Yes) is the image of "Smile" which is displayed on the right area 41*b* of the liquid crystal display 41. The "file 1" is displayed on the left area 41*a* of the liquid crystal display 41. The image of "Smile" is created only by reducing the size of the image data of the file 1.

Next, process S205 will be described. In the first exemplary embodiment, as shown in FIG. 3, among the file 2 or 3 whose image data has been determined to have a supported format and security and can not be printed without releasing the security, the file 2 can be viewed without releasing the security (S205: Yes), whereas the file 3 cannot be viewed without releasing the security (S205: No).

Accordingly, when the value of the file counter 23*b* is 2 and the image data of the file 2 has been acquired, it is determined that the image data can be viewed without releasing the security (S202: Yes, S203: Yes, S204: No, and S205: Yes), and the image data of the file 1 can be displayed as it is. A reduced image is thus created based on the image data (S208). Then, since the file 2 cannot be printed without releasing the security, the information (the image of "Release Required") indicating that it is required to release security for printing is combined with the reduced image created in process S208 (S209) Then, the reduced image created in process S209 is executed (S211). After that, the process ends.

As shown in FIG. 6B, the reduced image created in process S208 is an image of "Heart" displayed on the right area 41*b* of the liquid crystal display 41. "Release Required" is also displayed thereon so as to overlap the image of "Heart." The "file 2" is also displayed on the left area 41*a* of the liquid crystal display 41.

On the other hand, when the value of the file counter 23*b* is 3 and the image data of the file 3 has been acquired, it is determined that the image data cannot be viewed without releasing the security (S202: Yes, S203: Yes, S204: No, and S205: No). Since the image data can be neither printed nor viewed without releasing the security, the information indicating that it is required to release security (the image of "Release Required") is created (S210). Then, the display process of the image created in process S210 is executed (S211) After that, the process ends.

As shown in FIG. 6C, the reduced image created in process S210 is the image which is labeled with "Release required" and displayed on the right area 41*b* of the liquid crystal display 41. The "file 3" is also displayed on the left area 41*a* of the liquid crystal display 41.

As described above, when the screen display function is selected, the reduced image of the image data file 42*a* stored in the memory card 42 and an alternative image associated with the image data are displayed. It is thus possible to allow users to recognize whether the image data file 42*a* can be printed. Users do not execute printing of a file that is not printable; releases the security before printing a file, if required; and checks its reduced image before printing a file that is printable, thereby improved usability for the multi-function peripheral 1.

In particular, since the file 2 can be viewed without releasing the security but cannot be printed without releasing the security, the users may be misled into believing that the file 2 is printable if "Release Required" is not displayed for the file 2. As a result, the file that the users were misled to believe to be printable could not be printed even when the users tried to do so, thus the usability is impaired. However, an indication is provided to show that the file can be viewed without releasing the security but cannot be printed without releasing the security. This allows the users to correctly recognize the contents of the file.

Furthermore, when the file cannot be viewed without releasing the security, an alternative image of "Release Required" is displayed, thereby the information on the image data can be prevented from being made known to unauthorized persons.

[Index Printing Process]

Figure 7:
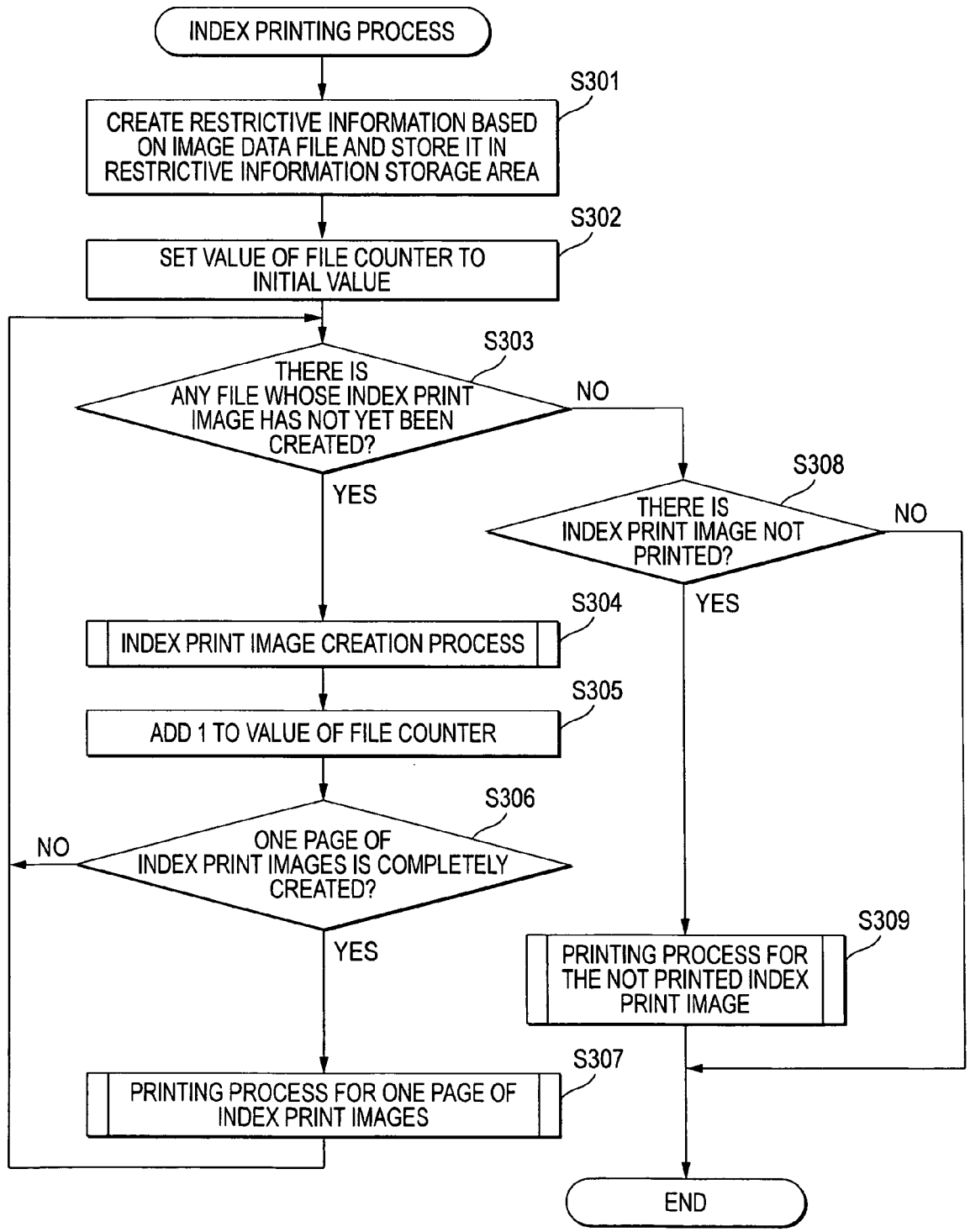
FIG. 7 is a flowchart showing an index printing process executed by the CPU of the multi-function peripheral.
Figure 8:
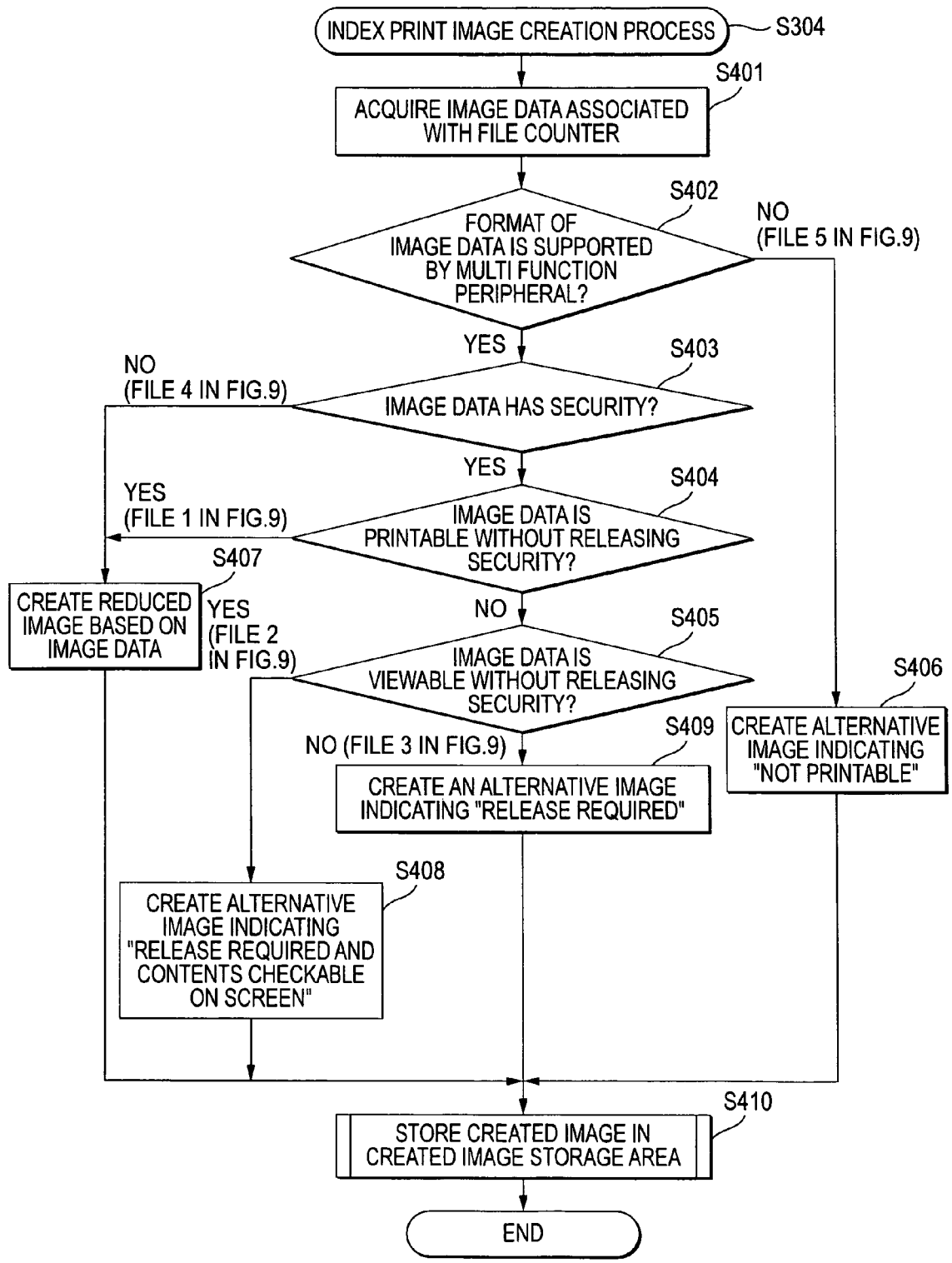
FIG. 8 is a flowchart showing an index print image creation process executed in the index printing process.
Figure 9:
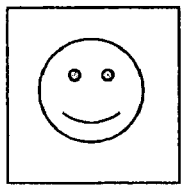
FIG. 9 is a view illustrating an example of image being index-printed on a recording medium.
Figure 9:
Figure 9:
Figure 9:
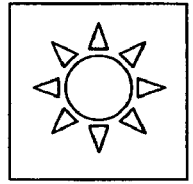
Figure 9:
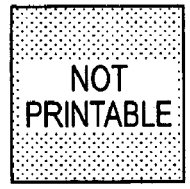

Next, referring to FIGS. 7 to 9, description will be made for the index printing process executed by the CPU 21 of the multi-function peripheral 1. FIG. 7 is a flowchart showing the index printing process executed by the CPU 21 of the multi-function peripheral 1. FIG. 8 is a flowchart showing the index print image creation process executed in the index printing process. FIG. 9 is a view showing an example of image being index-printed on a recording medium (e.g., a sheet). The "File List" printed as shown in FIG. 9 is text information that is always printed at a time of index printing.

The index printing process is executed when the operation key 40 is manipulated to select the "index printing" function among a plurality of functions. Furthermore, the index printing is executed to print the file name of the image data file 42*a* stored in the memory card 42 and the image data.

When the index printing process shown in FIG. 7 is executed, the restrictive information is created based on the image data file 42*a* stored in the memory card 42, and the created restrictive information is stored in the restrictive information storage area 23*a* (S301). The restrictive information that is stored in the restrictive information storage area 23*a* in process S301 is the restrictive information shown in FIG. 3. Since the restrictive information created in the same manner as the restrictive information is created in process S101, this creation process will not be detailed here.

When the restrictive information is created in process S301, an initial value 1 is set to the value of the file counter 23*b* (S302), and then it is determined whether any file exists, for which an image for index printing to be created in process S304 is not created, among the image data files 42*a* stored in the memory card 42, described later (S303).

In process S303, depending on whether the file counter 23*b* is less than the maximum value, it is determined whether there is any file with an index print image being not created. In the first exemplary embodiment with the five files, that is, the files 1 to 5, 1 is added to the value of the file counter 23*b* each time an index print image is created in process S305, described later. It is thus determined whether the value stored in the file counter 23*b* is less than 5 in process S303.

If it is determined that a file exists, for which an image for index printing is not created among image data files 42*a* stored in the memory card 42 (S303: Yes), the index print image creation process is executed in order to create the index print image of the next file (S304). Furthermore, the index print image creation process will be described later with reference to FIG. 8.

Since creating the index print image in process S304 means that the index print image of one file is created, 1 is added to the value of the file counter 23*b* (S305).

When one is added to the value of the file counter 23*b* in process S305, it is determined whether index print images to be printed on a recording medium has been created, i.e., one page of index print images has been completely created (S306).

When it is determined in process S306 that one page of index print images has not yet been created (S306: No), the flow returns to process S303 in order to create the index print image of the next file.

On the other hand, if it is determined in process S306 that one page of index print images has been created (S306: Yes), then the print process of page of index print images is executed (S307). After that, the flow returns to process S303.

The index printing according to the first exemplary embodiment is executed on recording media one by one. Thus, in process S306, it is determined whether one page of index print images has been created. In the first exemplary embodiment, 25 index print images can be printed on one recording medium.

Description now returns to process S303. If it has been determined in process S303 that the index print image has been created for all the files (S303: No), then it is determined whether any index print image has not yet been printed (S308).

If it is determined in process S308 that some index print image has not yet been printed (S308: Yes), then the printing process of the index print image which has not yet been printed is executed (S309). After that, the process ends. On the other hand, in process S308, if there is no index print image remaining which has not yet been printed (S308: No), i.e., when the number of files stored in the memory card 42 is a multiple of 25, there is no index print image remaining which has not yet been printed. Thus, the process ends.

As described above, according to the first exemplary embodiment, the five files are stored in the memory card 42. Since 25 index print images can be printed on one recording medium, it is determined that five index print image have not yet been printed (S308: Yes) and the printing process is executed in S309. The printing of the list of files in the printing process of S309 will be described later with reference to FIG. 9.

Next, referring to FIG. 8, description will be made for the index print image creation process executed in process S304. When the index print image creation process is executed in the index printing process, the image data associated with the value of the file counter 23*b* is acquired from the image data file 42*a* of the memory card 42 (S401).

Then, with reference to the format area 23*a*1 of the restrictive information created in process S101 (see FIG. 4) and stored in the restrictive information storage area 23*a*, it is determined whether the format of the acquired image data in process S401 is supported by the multi-function peripheral 1 (S402).

If it is determined in process S402 that the multi-function peripheral 1 supports the format of the acquired image data (S402: Yes), then with reference to the security area 23*a*2 of the restrictive information created in process S101 (see FIG. 4) and stored in the restrictive information storage area 23*a*, it is determined whether the acquired image data has security (S403).

If it is determined in process S403 that the acquired image data has security (S403: Yes), then with reference to the printable area 23*a*4 of the restrictive information created in process S101 (see FIG. 4) and stored in the restrictive information storage area 23*a*, it is determined whether the acquired image data can be printed without releasing the security (S404).

If it is determined in process S404 that the acquired image data cannot be printed without releasing the security (S404: No), then with reference to the viewable area 23*a*3 of the restrictive information created in process S101 (see FIG. 4) and stored in the restrictive information storage area 23*a*, it is determined whether the acquired image data can be viewed without releasing the security (S405).

Now, description will be made for processes S402 to S405 in more detail with the files 1 to 5 as shown in FIG. 3 taken as examples. First, process S402 will be described. In the first exemplary embodiment, as shown in FIG. 3, the format of the image data of the files 1 to 4 is recognizable by the multi-function peripheral 1 ("Supported") (S402: Yes), and only the image data of the file 5 is not recognizable by the multi-function peripheral 1 ("Not Supported") (S402: No).

Accordingly, when the value of the file counter 23b is 5 and the image data of the file 5 has been acquired, it is determined that the format of the image data is not supported by the multi-function peripheral 1 (S402: No) and can be neither printed nor displayed by the multi-function peripheral 1. Thus, an alternative image indicating "Not printable" is created (S406). After that, the flow proceeds to process S410.

The alternative image created in process S406 is for the file 5 shown in FIG. 9, and the alternative image labeled with "Not printable" is printed under the print of the file 5.

Next, process S403 will be described. In the first exemplary embodiment, as shown in FIG. 3, among the files 1 to 4 which have been determined to have a supported image data format, the files 1 to 3 have security (S403: Yes), and the file 4 has no security (S403: No).

Accordingly, when the value of the file counter 23b is 4 and the image data of the file 4 has been acquired, it is determined that the image data has no security (S402: Yes, S403: No). Since the image data of the file 4 can be printed as it is, a reduced image is created based on the image data (S407). Then, the flow proceeds to process S410.

The reduced image created in process S407 is the file 4 shown in FIG. 9, and the alternative image "Sun" is printed under the print of the file 4. Furthermore, the image of "Sun" is an as is reduced image of the image data of the file 4.

Next, process S404 will be described. In the first exemplary embodiment, as shown in FIG. 3, among the files 1 to 3 whose image data has been determined to have the format supported by the multi-function peripheral 1 and security, the file 1 can be printed without releasing the security (S404: Yes), whereas the file 2 or 3 cannot be printed without releasing the security (S404: No).

Accordingly, when the value of the file counter 23b is 1 and the image data of the file 1 has been acquired, it is determined that the image data can be printed without releasing the security (S402: Yes, S403: Yes, and S404: Yes) Since the image data of the file 1 can be printed as it is, a reduced image is created based on the image data (S407) and then the flow proceeds to process S410.

The reduced image created in process S407 if it is determined that the file 1 can be printed without releasing the security (S404: Yes) is the file 1 shown in FIG. 9, and the image of "Smile" is printed under the print of the file 1. The image of "Smile" is image reduced from the image data of the file 1.

Next, process S405 will be described. In the first exemplary embodiment, as shown in FIG. 3, among the files 2 or 3 whose image data has been determined to have a supported format and security and cannot be printed without releasing the security, the file 2 can be viewed without releasing the security (S405: Yes), whereas the file 3 cannot be viewed without releasing the security (S405: No).

Accordingly, when the value of the file counter 23b is 2 and the image data of the file 2 has been acquired, it is determined that the image data can be viewed without releasing the security (S402: Yes, S403: Yes, S404: No, and S405: Yes). Thus, the image data of the file 2 can be viewed without releasing the security but cannot be printed. In this case, an alternative image is created which indicates that it is required to release security for printing and that contents of the image data can be checked on the screen (the liquid crystal display 41) (S408). After that, the flow proceeds to process S410.

The reduced image created in process S408 is the file 2 shown in FIG. 9, and the alternative image labeled with "Release required and Contents checkable on screen" is printed under the print of the file 2.

On the other hand, when the value of the file counter 23b is 3 and the image data of the file 3 has been acquired, it is determined that the image data cannot be viewed without releasing the security (S402: Yes, S403: Yes, S404: No, and S405: No). Since the image data can be neither printed nor viewed without releasing the security, information indicating that it is required to release security is created (S409). After that, the flow proceeds to process S410.

The reduced image created in process S409 is the file 3 shown in FIG. 9, and the alternative image labeled with "Release Required" is printed under the print of the file 5.

The image created in processes S406 to S409 is stored in the created image storage area 23c (S410), and then the process ends. Furthermore, the printing process for one page of index print image (S307) and the printing process for the index print image that has not yet been printed (S309) are executed based on the image stored in the created image storage area 23c in process S410.

As described above, when the index printing function is selected, the reduced image of the image data file 42a stored in the memory card 42 and the alternative image associated with the image data are displayed. It is thus possible to allow the users to recognize whether the image data file 42a can be printed. The users do not execute printing of a file that is not printable; release the security before printing a file, if required; and checks its reduced image before printing a file that is printable, thereby usability is improved for the multi-function peripheral 1.

It is also possible to allow the users to recognize that the file 2 can be viewed without releasing the security, and the contents thereof can be displayed and thereby checked on the screen. When the users desire to print the image data, it is thus possible to print it without unnecessary procedures, i.e., in the steps of first checking the contents thereof and then releasing the security for printing.

On the other hand, when the image data cannot be printed without releasing the security, the alternative image of "Release Required" is displayed. This makes it possible to prevent the information on the image data from being made known to unauthorized persons.

Figure 10:
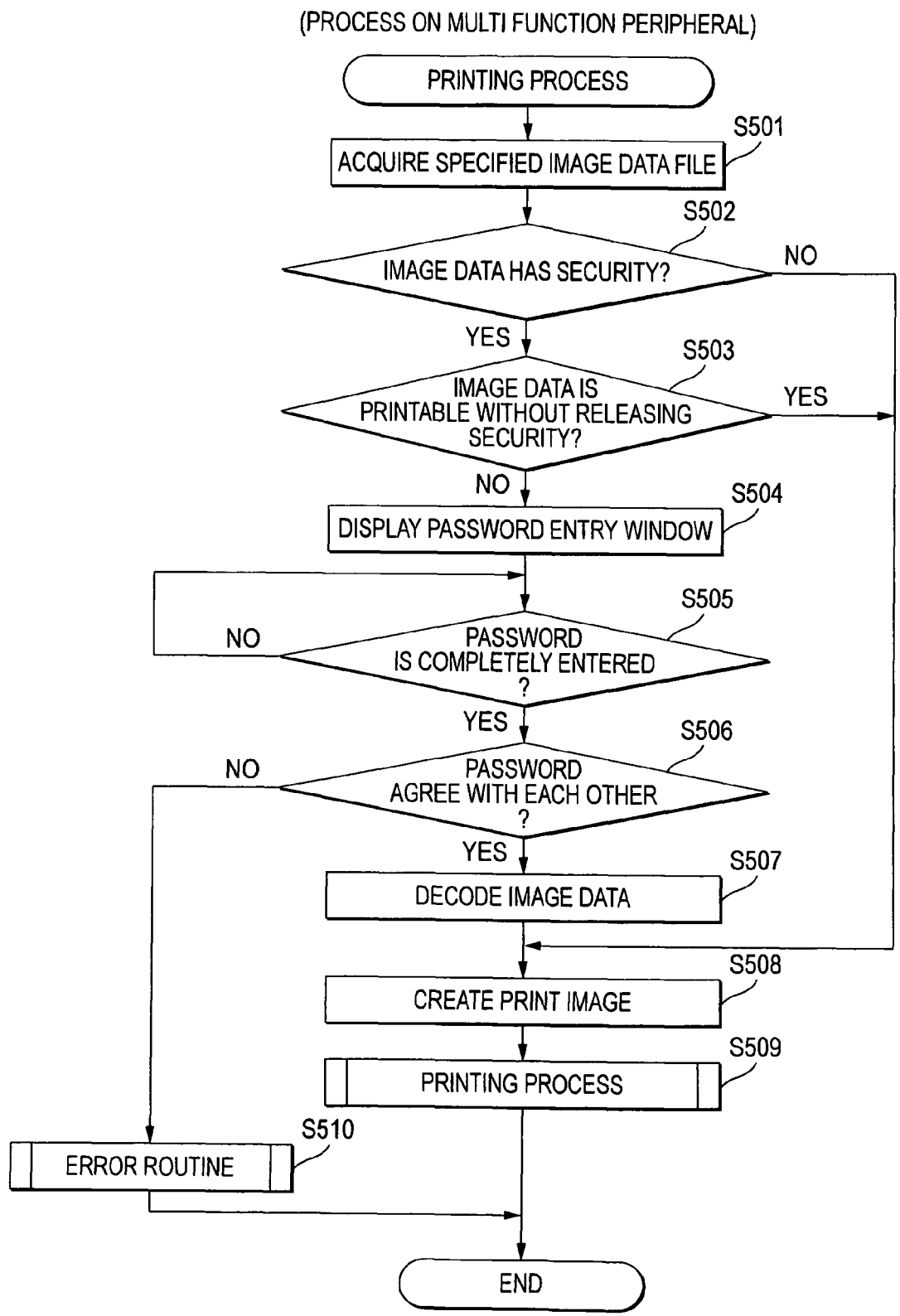
FIG. 10 is a flowchart showing the printing process executed by the CPU of the multi-function peripheral.

Next, referring to FIG. 10, description will be made for the printing process for printing the image data based on the image data file 42a stored in the memory card 42. FIG. 10 is a flowchart showing the printing process executed by the CPU 21 of the multi-function peripheral 1. The printing process is executed when an operation key 40 is pressed to select the "Printing" function among a plurality of functions and select a file (the files 1 to 4) other than a "Not printable" file with the "Printing" function selected. In the first exemplary embodiment, a "Not printable" file cannot be selected.

When the printing process shown in FIG. 10 is executed, the image data file 42a which is selected, for example, by users is acquired from the memory card 42 (S501). Then, it is determined whether the image data of the acquired image data file has security (S502). As described above, in the first exemplary embodiment, when the files 1 to 3 are selected, it is determined that security exists (S502: Yes). When the file 4 is selected, it is determined that no security exists (S502: No).

Accordingly, when the image data file acquired in process S501 is the file 4, no security exists and the image data can be directly printed as it is. Thus, a print image is created (S508) and then the print process is executed (S509) After that, the process ends.

On the other hand, when the image data file acquired in process S501 is the files 1 to 3, it is determined whether the acquired image data can be printed without releasing the security (S503). In the first exemplary embodiment, when the file 1 is selected, the image data can be printed without releasing the security (S503: Yes), whereas when the file 2 or 3 is selected, it cannot be printed without releasing the security (S503: No).

Accordingly, when the image data file acquired in process S501 is the file 1, it can be printed without releasing the security (S503: Yes). Thus, a print image is created (S508) and then printed (S509). After that, the process ends.

On the other hand, when the image data file acquired in process S501 is the file 2 or 3, it cannot be printed without releasing the security (S503: No). Thus, in order to release the security, a password entry window is displayed on the liquid crystal display 41 (S504).

When the password entry window is displayed, it is determined whether the entry of the password is finished (S505) and finishing of entering the password is waited (S505: No). When entering the password has finished (S505: Yes), the flow proceeds to process S506.

It is determined in process S506 whether the entered password agrees with (corresponds to) the password pre-stored in the ROM 22 (S506). If not (S506: No), the entry is regarded to have been made by a user who does not know the password. Thus, an error routine is executed (S510), and then the process ends. The error routine displays "Not printable" on the liquid crystal display 41, allows "Not printable" to be announced via a speaker 72, or informs the users of it using the combination of the liquid crystal display 41 and the speaker 72.

On the other hand, if the entered password agrees with the password pre-stored in the ROM 22 in process S506 (S506: Yes), the entry is regarded to have been made by a user who knows the password. Thus, the selected file is decoded (S507), a print image is created based on the decoded image data (S508), and then the print process is executed (S509). After that, the process ends.

As described above, when the multi-function peripheral 1 which has direct printing function and a file to be printed has security, the multi-function peripheral prompts users to enter a password and printing is executed only when the password is correct. Accordingly, the multi-function peripheral 1 can prevent unrestricted printing by unauthorized users. It is thus possible to prevent leakage of image data including secret documents or images.

<Second Exemplary Embodiment>

Next, referring to FIG. 11, description will be made for a second exemplary embodiment. In the first exemplary embodiment, for such a file (the file 2) that can be viewed without releasing the security but cannot be printed without releasing the security, the screen display process combines the reduced image and the image of "Release Required" to display the resulting image on the liquid crystal display 41 (see FIG. 6B). Instead of this, in the second exemplary embodiment, for such a file (the file 2) that can be viewed without releasing the security but cannot be printed without releasing the security, its reduced image is not displayed but an alternative image is displayed on the liquid crystal display 41. The same components as those of the first exemplary embodiment will be indicated with the same reference symbols and description thereof is omitted.

FIGS. 11A to 11E are views illustrating examples of the screen displayed on the liquid crystal display 41 according to the second exemplary. FIGS. 11A and 11C to 11E show the same screen as that of the first exemplary embodiment shown in FIGS. 6A and 6C to 6E, and thus description thereof is omitted; description will be made only to the display of FIG. 11B.

Figure 11A:
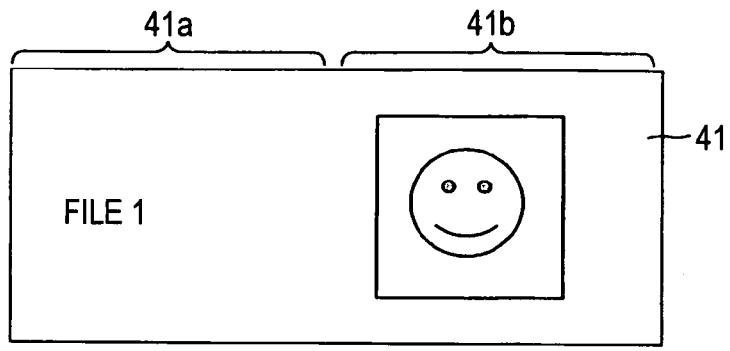
FIGS. 11A to 11E are views illustrating examples of screen displayed on the liquid crystal display according to the second exemplary embodiment.
Figure 11B:
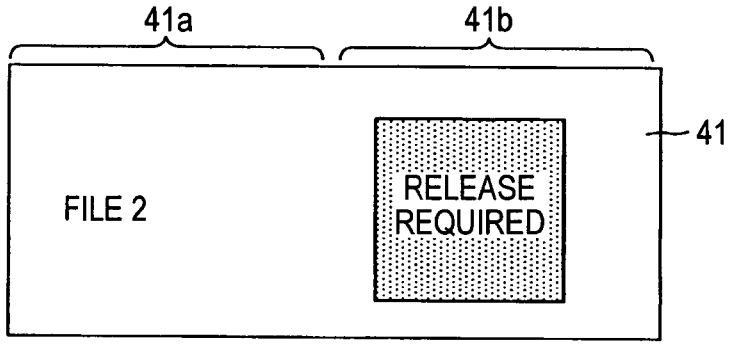
Figure 11C:
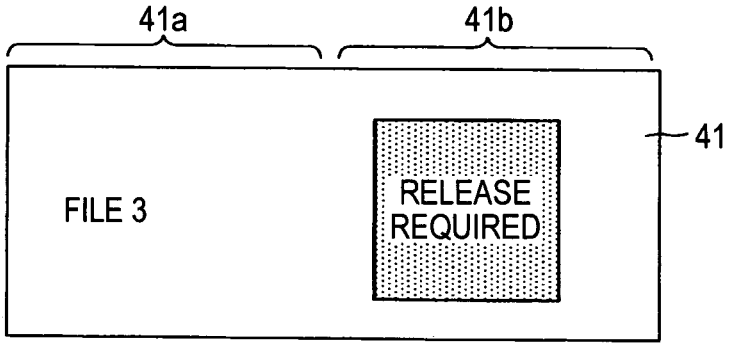
Figure 11D:
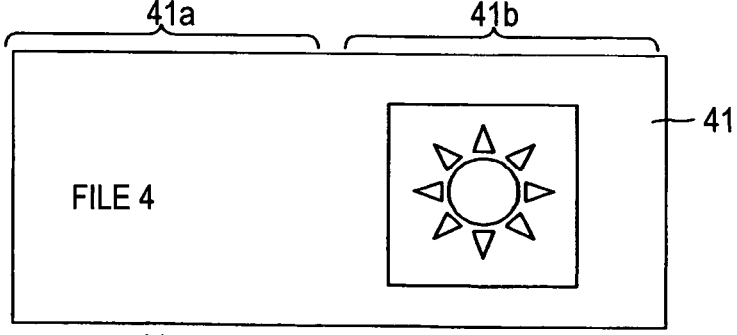
Figure 11E:
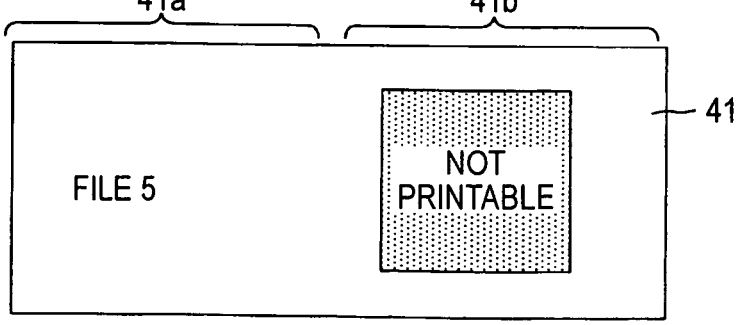

As shown in FIG. 11B, for the file 2 that can be viewed without releasing the security but cannot be printed without releasing the security, the alternative image labeled with "Release Required" is displayed on the right area 41a of the liquid crystal display 41. That is, in the second exemplary embodiment, the same process as process S210 is executed instead of processes S208 and S209 shown in FIG. 5.

Thus, according to the second exemplary embodiment, when image data can be viewed without releasing the security but cannot be printed without releasing the security, the image data is also prohibited from being viewed. A file may not be able to be printed without releasing the security because the contents of the file are presumably not desired to be known to unauthorized persons. In this case, any reduced image displayed on the screen would reveal the contents of its file to unauthorized users. However, according to the second exemplary embodiment, since the reduced image of any file that cannot be printed without releasing the security would not be displayed on the screen, it is possible to prevent the contents of the file from being made known to unauthorized users.

The multi-function peripheral 1 may also be configured to have a screen display switching function for switching between the first exemplary embodiment and the second exemplary embodiment so that the users can make a change as desired.

In the foregoing, while the exemplary embodiments of the present invention has been described, it will be understood by those skilled in the art that the present invention is not limited to the aforementioned exemplary embodiments, but various modifications may be made thereto without deviating from the spirit and scope of the present invention.

For example, in the above exemplary embodiments, restrictive information is created which is associated with all the image data files 42a stored in the memory card 42. However, for example, the restrictive information may be made for a part of image data files 42a stored in the memory card 42. In this case, specific files such as only document files, only files containing images, files for some types of an application program or an operating system may be selected as the part of image data files 42a. Furthermore, image data files stored in the memory of a computer, which is connected to (communicates with) the multi-function peripheral 1 via a parallel I/F or a network I/F, may be acquired.

Furthermore, in the above exemplary embodiments, for index printing and screen display, an image reduced from image data which can be viewed or printed without releasing the security is displayed or printed. However, any image can be employed for this purpose as long as it can represent the contents of the image data file. For example, since the file 2 shown in FIG. 6B cannot be printed without releasing the security, "Not printable" can be employed instead of "Release Required." Furthermore, since the file 5 shown in FIG. 6E may also be labeled with "Not Recognizable" instead of "Not printable." Likewise, since the file 2 shown in FIG. 9 cannot be printed without releasing the security, only "Release Required" may be also be printed instead of "Release required and Contents checkable on screen."

Security may be defined so that image data can be not only viewed and printed without releasing the security but also combined and copied without releasing the security. In this case, an alternative image indicating this definition may be displayed.

The above exemplary embodiments employ both the index printing function and the screen display function; however, the multi-function peripheral may employ either one of them.

In the above exemplary embodiments, the multi-function peripheral 1 includes the index printing function and the screen display function, but may also include a printer that has the printing function and the display function.

According to the above exemplary embodiments, information is displayed as to whether displaying or printing of the contents is restricted by the restrictive information. Accordingly, such an effect may be provided that users are able to correctly recognize whether the file information stored in the storage device can be displayed or printed.

According to the above exemplary embodiments, such a situation can be avoided that users attempt to print information resulting in the printing not being executed or only blank paper coming out of the printer with no printing executed based on the output information. This allows users to print information as desired, thereby providing improved usability for the printer.

According to the above exemplary embodiments, different information are displayed between in a case where the restrictive information indicates that display of an image data file is permitted, and in a case where the restrictive information indicates that display of the image data file is permitted but print of the image data file is prohibited. This allows users to recognize whether the image data file can be printed based on the displayed information.

According to the above configuration, information is displayed as to not only whether the image data file corresponding to the displayed information can be printed but also that releasing of the prohibition is required to print the image data file. Accordingly, to print such image data file that requires releasing of prohibition, users are allowed to print information after the releasing of the prohibition. Such an effect is thus provided that unnecessary operational procedures are eliminated, thereby providing improved usability.

According to the above configuration, information is displayed, which indicates that releasing of the prohibition is required to print the image data file if displaying of information based on the image data file is prohibited. With no indication provided when displaying of information based on the image data file is prohibited, users may be misled into believing that no file information is available. However, an indication is provided based on the displayed information to prompt for releasing the prohibition, there by making it possible to prevent users from being misled into believing that no file information is available.

According to the above configuration, information is printed as to whether displaying or printing of the contents is restricted by the restrictive information. Accordingly, such an effect is thus provided that the users are able to correctly recognize whether the file information stored in the storage device can be displayed or printed.

Furthermore, users can recognize the contents restricted by the restrictive information, so that the users will not deliberately select and print the image data file that is prohibited from printing. Unlike the conventional case, this eliminates a chance of executing selecting and printing a file that is not printable. Thus, such a situation can be avoided that the user attempts to print information resulting in the printing not being executed or only blank paper coming out of the printer with no printing executed based on the output information. This allows users to print information as desired, thereby providing improved usability for the printer.

According to the above configuration, different information is printed between in a case where print of the image data file is permitted and in a case where print of the image data file is prohibited. Such an effect is thus provided that ensures that the different print information allow users to recognize whether the output information can be printed based on the print information having been printed.

According to the above configuration, information is printed which indicates that printing of information based on the print data file is prohibited but displaying of information based on the image data file is permitted. When having recognized that displaying of information based on the image data file is permitted, the users can display information based on the image data file, thereby check the contents of the image data file. Such an effect is thus provided that users can check the contents of the image data file before printing the image data file.

What is claimed is:

1. A printer having a direct-printing function for reading and printing content information stored in a storage device, the printer comprising:
    an interface unit which receives the storage device, the storage device storing content information for print or display and restrictive information for controlling output of the content information;
    a reading unit which reads the restrictive information from the storage device;
    a setting unit which sets indication information according to the content information and the restrictive information;
    an indication outputting unit which displays information based on the indication information set by the setting unit; and
    a releasing unit which releases prohibiting of display or print by display prohibition information for prohibiting the display based on the content information or by the print prohibition information for prohibiting the print based on the content information,
    wherein the setting unit sets first information, which indicates the content information, as the indication information if the restrictive information includes display permission information for permitting display based on the content information, and
    wherein the setting unit sets second information which includes the first information added with information prompting to release prohibition by the releasing unit as the indication information if the restrictive information includes the display permission information and the print prohibition information for prohibiting the print based on the content information.

2. The printer according to claim 1,
    wherein the setting unit sets third information prompting to release prohibition by the releasing unit as the indication information if the restrictive information includes the display prohibition information.

3. The printer according to claim 1,
    wherein the restrictive information includes:
        either one of the display permission information for permitting display based on the content information and display prohibition information for prohibiting the display based on the content information; and
        either one of print permission information for permitting print based on the content information and the print prohibition information for prohibiting the print based on the content information.

4. The printer according to claim 1,
    wherein the storage device stores plural sets of content information and restrictive information, and wherein the indication outputting unit displays information based on indication information from each of the plural sets of content information and restrictive information one by one.

5. A printer having a direct-printing function for reading and printing content information stored in a storage device, the printer comprising:
an interface unit which receives the storage device, the storage device storing content information for print or display and restrictive information for controlling output of the content information;
a reading unit which reads the restrictive information from the storage device;
a setting unit which sets indication information according to the content information and the restrictive information;
an indication outputting unit which prints information based on the indication information set by the setting unit; and
a releasing unit which releases prohibition of print by print prohibition information for prohibiting the print based on the content information,
wherein the setting unit sets first information, which indicates the content information, as the indication information if the restrictive information includes print permission information for permitting print based on the content information, and
wherein the setting unit sets second information prompting to release prohibition by the releasing unit as the indication information if the restrictive information includes the print prohibition information.

6. The printer according to claim 5,
wherein the storage device stores plural sets of content information and restrictive information, and
wherein the indication outputting unit prints information based on indication information from each of the plural sets of content information and restrictive information in index manner.

7. A printer having a direct-printing function for reading and printing content information stored in a storage device, the printer comprising:
an interface unit which receives the storage device, the storage device storing content information for print or display and restrictive information for controlling output of the content information;
a reading unit which reads the restrictive information from the storage device;
a setting unit which sets indication information according to the content information and the restrictive information;
an output unit which prints information based on the indication information set by the setting unit; and
wherein the setting unit sets first information, which indicates the content information, as the indication information if the restrictive information includes print permission information for permitting print based on the content information, and
wherein the setting unit sets second information, which indicates that display based on the content information is permitted, as the indication information if the restrictive information includes display permission information for permitting display based on the content information and print prohibition information for prohibiting print based on the content information.

8. The printer according to claim 7, wherein the interface unit removably receives the storage device.

9. The printer according to claim 7, further comprising:
a releasing unit which releases prohibition of print by the print prohibition information.

10. The printer according to claim 7,
wherein the storage device stores plural pieces of sets of content information and restrictive information, and
wherein the indication outputting unit prints information based on indication information from each of the plural sets of content information and restrictive information in index manner.

11. A non-transitory computer-readable medium having a computer program stored thereon and readable by a computer, the computer program, when executed by the computer, causing the computer to perform operations comprising:
reading content information for print or display and restrictive information for controlling output of the content information from a storage device;
setting indication information according to the content information and the restrictive information;
causing a display device to display information based on the set indication information;
releasing prohibition of display or print by display prohibition information for prohibiting the display based on the content information or by print prohibition information for prohibiting the print based on the content information,
wherein the setting step sets first information, which indicates the content information, as the indication information if the restrictive information includes the display permission information for permitting display based on the content information, and
wherein the setting step sets second information including the first information added with information prompting to release prohibition by the releasing step as the indication information if the restrictive information includes the display permission information and the print prohibition information for prohibiting the print based on the content information.

12. The non-transitory computer-readable medium according to claim 11,
wherein the setting step sets third information prompting to release prohibition by the releasing step as the indication information if the restrictive information includes the display prohibition information.

13. A non-transitory computer-readable medium having a computer program stored thereon and readable by a computer, the computer program, when executed by the computer, causing the computer to perform operations comprising:
reading content information for print or display and restrictive information for controlling output of the content information from a storage device;
setting indication information according to the content information and the restrictive information;
causing a display device to display information based on the set indication information;
releasing prohibition of print by print prohibition information for prohibiting the print based on the content information,
wherein the setting step sets first information, which indicates the content information, as the indication information if the restrictive information includes print permission information for permitting print based on the content information, and
wherein the setting step sets second information prompting to release prohibition by the releasing step as the indication information if the restrictive information includes the print prohibition information.

14. The non-transitory computer-readable medium according to claim 13,
- wherein the storage device stores plural sets of content information and restrictive information, and
- wherein the causing step causes the print device to print information based on indication information from each of the plural sets of content information and restrictive information n index manner.

15. A non-transitory computer-readable medium having a computer program stored thereon and readable by a computer, the computer program, when executed by the computer, causing the computer to perform operations comprising:
- reading content information for print or display and restrictive information for controlling output of the content information from a storage device;
- setting indication information according to the content information and the restrictive information; and
- causing a print device to print information based on the set indication information,
- wherein the setting step sets first information, which indicates the content information, as the indication information if the restrictive information includes print permission information for permitting print based on the content information, and
- wherein the setting step sets second information, which indicates that display based on the content information is permitted if the restrictive information includes display permission information for permitting display based on the content information and print prohibition information for prohibiting print based on the content information.

16. The non-transitory computer-readable medium according to claim 15, wherein the operations further comprises:
- releasing prohibition of print by the print prohibition information.

17. The non-transitory computer-readable medium according to claim 15,
- wherein the storage device sores plural sets of content information and restrictive information, and
- wherein the causing step causes the print device to print information based on indication information from each of the plural sets of content information and restrictive information in index manner.

* * * * *